(12) United States Patent
Ruiz

(10) Patent No.: US 7,380,547 B1
(45) Date of Patent: Jun. 3, 2008

(54) ADAPTIVE NOX EMISSIONS CONTROL FOR ENGINES WITH VARIABLE CAM PHASERS

(75) Inventor: Victoriano Ruiz, Brighton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/561,001

(22) Filed: Nov. 17, 2006

(51) Int. Cl.
*F02D 41/00* (2006.01)

(52) U.S. Cl. ............... 123/679; 73/117.3; 701/109
(58) Field of Classification Search ......... 123/679, 123/672, 698, 345–348, 681–683, 568.16, 123/568.21; 701/108, 109; 73/117.3, 118.2
See application file for complete search history.

(56) References Cited

U.S. PATENT DOCUMENTS 6,899,093 B2 * 5/2005 Center ............... 123/681

* cited by examiner

*Primary Examiner*—Willis R. Wolfe
*Assistant Examiner*—Johnny H. Hoang

(57) ABSTRACT

A control system for adjusting levels of emissions exiting an engine includes a NOx sensor that generates a NOx signal in response to oxides of nitrogen (NOx) in an exhaust gas and a control module that communicates with the cam phaser. The rotational position of the cam phaser controls an actuation time when the camshaft opens the exhaust valve during rotation of the camshaft. The control module further receives the NOx signal, and calculates a NOx level of the exhaust gas based on the NOx signal. The control module compares the NOx level to a predetermined threshold range and adjusts the cam phaser to achieve a rotational position that releases a desired level of NOx from the engine when the NOx level exceeds the predetermined threshold range. The control module further stores the rotational position in a storage device when the NOx level is within the predetermined threshold range.

12 Claims, 2 Drawing Sheets

ADAPTIVE NOX EMISSIONS CONTROL FOR ENGINES WITH VARIABLE CAM PHASERS

FIELD OF THE INVENTION

The present invention relates to emissions control systems for vehicles, and more particularly to emissions control systems that reduce oxides of nitrogen in emissions.

BACKGROUND OF THE INVENTION

Engine operation involves combustion that generates exhaust gas. During combustion, an air and fuel (air/fuel) mixture is combusted inside a cylinder to drive a piston. The piston rotatably drives a crankshaft that ultimately rotates one or more camshafts. Exhaust gas is created from combustion and is released from the cylinders into an exhaust system. The amount of exhaust gas released is regulated by the opening and/or closing positions of an exhaust valve that is mechanically actuated by a cam lobe coupled to the camshaft. The exhaust gas may contain residuals such as, oxides of nitrogen (NOx) and carbon monoxide (CO).

Retaining exhaust gas inside the cylinder during the exhaust stroke, also known as exhaust gas retention, burns increased levels of NOx during the following combustion stroke and may decrease levels of emissions exiting the engine. Specifically, retaining exhaust gases in the combustion chamber of the cylinder dilutes the air/fuel mixture and slows the burn rate. The reduced burn rate results in increased combustion chamber temperatures for a longer period of time and burns greater amounts of NOx to reduce emissions.

Exhaust gas retention can be accomplished by adjusting the rotational position of the exhaust camshaft to vary the timing of the exhaust valve. The valve timing determines the amount of exhaust that remains in the cylinder during the exhaust stroke. Levels of NOx retained at various speeds and loads are predetermined and programmed in a static reference table.

Although design differences and component wear can effect engine operation, exhaust gas retention is typically limited to the static reference table.

SUMMARY OF THE INVENTION

Accordingly, the present invention provides a control system for adjusting levels of emissions exiting an engine with a camshaft that is associated with an exhaust valve and a cam phaser that interfaces with the camshaft. The control system includes a NOx sensor that generates a NOx signal in response to oxides of nitrogen (NOx) in an exhaust gas and a control module that communicates with the cam phaser. The control module receives the NOx signal, and calculates a NOx level of the exhaust gas based on the NOx signal. The control module compares the NOx level to a predetermined threshold range and adjusts the cam phaser to achieve a rotational position that releases a desired level of NOx from the engine when the NOx level exceeds the predetermined threshold range. The control module stores a rotational position value based on the rotational position of the cam phaser in a storage device when the NOx level is within the predetermined threshold range. The rotational position of the cam phaser controls an actuation time when the camshaft opens the exhaust valve during rotation of the camshaft.

In one feature, the exhaust valve position determines an amount of the exhaust gas that exits the engine.

In another feature, the predetermined threshold range is defined as having an upper NOx level value and a lower NOx level value.

In yet another feature, the storage device includes a two-dimensional reference table that is indexed by a range of predetermined speed (RPM) values and a range of predetermined mass air flow (MAF) values.

In still another feature, the control module stores a rotational position value based on the rotational position according to a corresponding speed value and a corresponding load value included in the reference table.

In yet another feature, the control module adjusts a rotational position of the cam phaser based on a rotational position value included in the reference table when the engine operates at a corresponding speed and a corresponding load included in the reference table.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
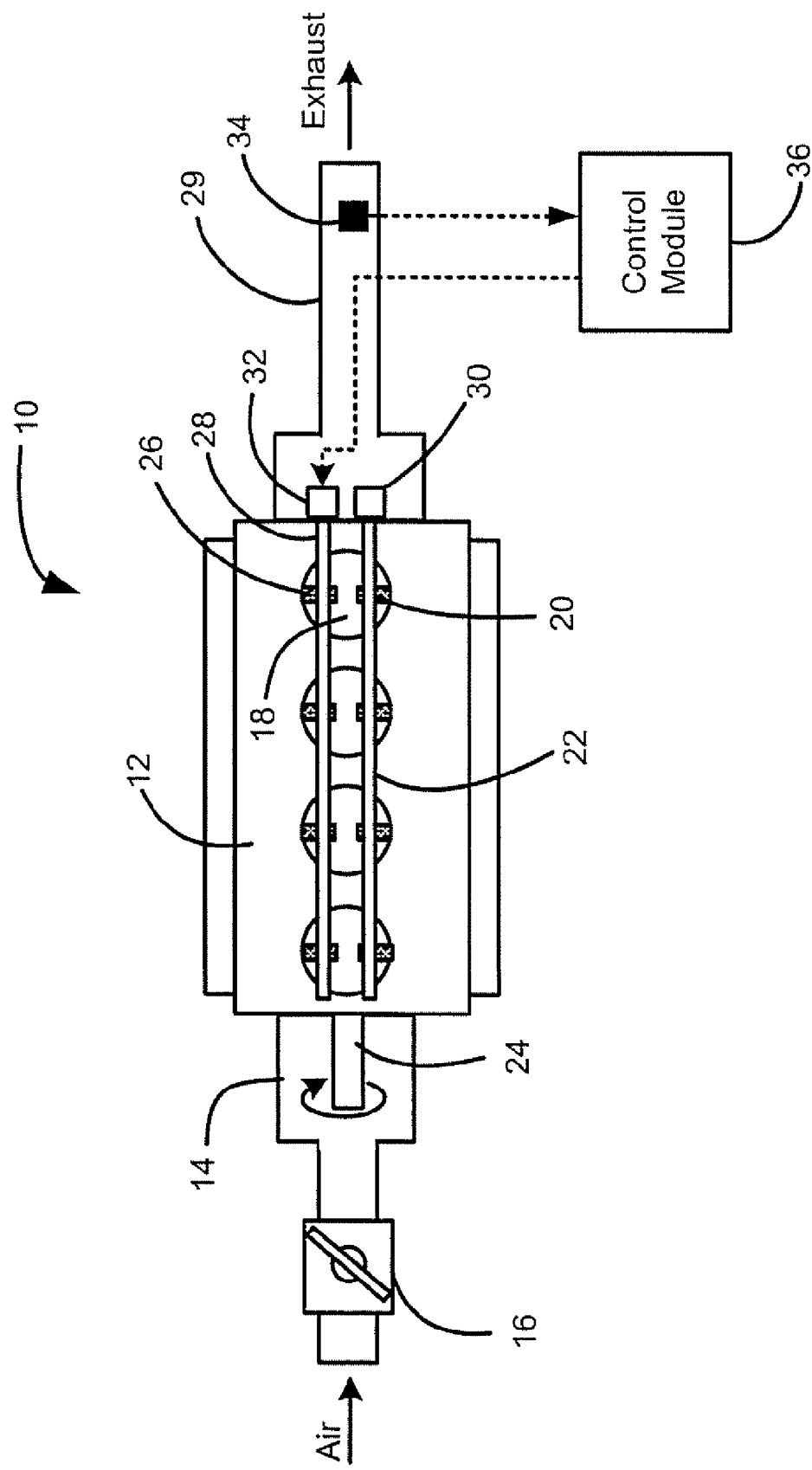
FIG. 1 is a functional block diagram of an engine control system providing an emissions control system using a NOx sensor according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit and/or other suitable components that provide the described functionality.

Referring now to FIG. 1, an engine system 10 is schematically illustrated. The engine system 10 includes an engine 12 that combusts an air and fuel (air/fuel) mixture to produce drive torque. Air is drawn into an intake manifold 14 through a throttle 16. The throttle 16 regulates mass air flow into the intake manifold 14. Air within the intake manifold 14 is delivered into cylinders 18 through 14 an intake valve (not shown). Although three cylinders 18 are illustrated, it can be appreciated that the emissions control system of the present invention can be implemented in engines having a plurality of cylinders 18 including, but not limited to, 2, 3, 4, 5, 6, 8, 10 and 12 cylinders.

A fuel injector (not shown) injects fuel which is combined with the air as it is drawn into the cylinder 18 through an intake port (not shown). The fuel injector can be an injector associated with an electronic or mechanical fuel injection system (not shown), or another system for mixing fuel with intake air. The fuel injector is controlled to deliver a desired air/fuel ratio within each cylinder 18. Typically, one unit of fuel is delivered for every 14.7 units of air delivered into the cylinder.

An intake valve 20 selectively opens and closes to enable the air/fuel mixture to enter the cylinder 18. The intake valve position is regulated by an intake camshaft 22. A piston (not shown) compresses the air/fuel mixture within the cylinder 18. A spark plug (not shown) initiates combustion of the air/fuel mixture and drives the piston in the cylinder 18. The piston drives a crankshaft 24 to produce drive torque. The crankshaft 24 rotatably drives camshafts using a timing chain (not shown) to regulate the timing of the intake and exhaust valves 20, 26. Although a single intake camshaft and a single exhaust camshaft are shown 20, 28, it can be anticipated that a single camshaft or dual intake camshafts and dual exhaust camshafts may be used.

Exhaust gas is produced inside the cylinder 18 as a result of the combustion process. The exhaust gas is forced out an exhaust port (not shown) into an exhaust manifold 29 when an exhaust valve 26 is in an open position. The exhaust gas may be treated by an exhaust treatment system (not shown) prior to exiting into the atmosphere. Although single intake and exhaust valves 20, 26 are illustrated, it can be appreciated that the engine 12 can include multiple intake and exhaust valves 20, 26 per cylinder 18.

Intake and exhaust cam phasers 30, 32, respectively, adjust the rotational position of the intake and exhaust camshafts 22, 28, respectively. More specifically, the rotational position of the intake and exhaust camshafts 22, 28 can be retarded and/or advanced with respect to each other or with respect to a location of the piston within the cylinder 18 or the rotational position of the crankshaft 24. In this manner, the timing and/or lift of the intake and exhaust valves 20, 26 can be varied with respect to each other or with respect to a location of the piston within the cylinder 18. By varying the lift position of the exhaust valve 26, the amount of exhaust retained in the cylinder 18 can be adjusted.

The engine system 10 further includes a NOx sensor 34 and a control module 36. The NOx sensor 34 is responsive to exhaust gas and outputs a NOx signal ($NOx_{SIGNAL}$) indicating levels of NOx exiting the engine 12. The NOx sensor 34 can sense exhaust gas chemically, optically, or using another method.

The control module 36 receives $NOx_{SIGNAL}$ and adjusts levels of emissions exiting the engine 12 based on a predetermined threshold range. The threshold range can be defined as having an upper NOx level value and a lower NOx level value. Prior to adjusting the exhaust cam phaser 32, the control module 36 determines the level of NOx exiting the engine 12 based on $NOx_{SIGNAL}$ and compares the level of NOx exiting the engine 12 to the predetermined threshold range ($NOx_{THR}$). $NOx_{THR}$ is defined as having an upper NOx level value and a lower NOx level value. When the NOx level exiting the engine 12 is not within $NOx_{THR}$, the control module 36 outputs a cam phaser control signal that rotatably adjusts the exhaust cam phaser 32. The exhaust cam phaser 32 receives the cam phaser control signal and rotatably adjusts the exhaust cam phaser position ($\theta_{EXHAUST\_CAM}$). The position of the cam phaser 32 advances and/or retards the actuation time at which the exhaust camshaft 28 opens and/or closes the exhaust valve 26. The control module 36 repeats the operation described above until the level of NOx exiting the engine 12 is within $NOx_{THR}$.

The control module 36 can store $\theta_{EXHAUST\_CAM}$ in a two-dimensional reference table. The reference table can be indexed by a predetermined range of speed (RPM) values and a predetermine range of mass air flow intake (MAF) values. When the NOx exiting the engine 12 is within $NOX_{THR}$, the control module 36 stores $\theta_{EXHAUST\_CAM}$ according to a respected RPM value and respected MAF value. The control module 36 can refer to the reference table in future driving scenarios and can adjust the exhaust camshaft 28 based on the stored $\theta_{EXHAUST\_CAM}$ when similar a operating condition (i.e. a similar speed and a similar load) is encountered.

For example, the control module 36 outputs $Cam_{ADV}$ to advance the exhaust camshaft 28 when the level of NOx exiting the engine 12 exceeds $NOx_{THR}$. Advancing the exhaust cam phaser 32 during the exhaust stroke advances the actuation time when exhaust camshaft closes the exhaust valve 26. Advancing the closing position of the exhaust valve 26 prevents an amount of exhaust gas from escaping the cylinder 18. The retained exhaust gas dilutes the air/fuel mixture and lowers the combustion temperature below a point at which nitrogen combines with oxygen to form NOx. As a result, the level of NOx exiting the engine 12 can be reduced.

The control module 36 can further determine whether $\theta_{EXHAUST\_CAM}$ was adjusted properly. Specifically, the control module 36 measures an initial level of NOx exiting the engine 12 prior to adjusting the exhaust cam phaser 32 ($NOx_{PRE}$). After adjusting the exhaust cam phaser 32, the control module 36 remeasures the level of NOx after adjusting the exhaust cam phaser 32 ($NOx_{POST}$). When $NOx_{POST}$ exceeds $NOx_{PRE}$, the control module 36 assumes $\theta_{EXHAUST\_CAM}$ was rotated in the wrong direction. During the subsequent exhaust stroke, the control module 36 adjusts the rotation of exhaust cam phaser 32 in the opposite direction.

Figure 2:
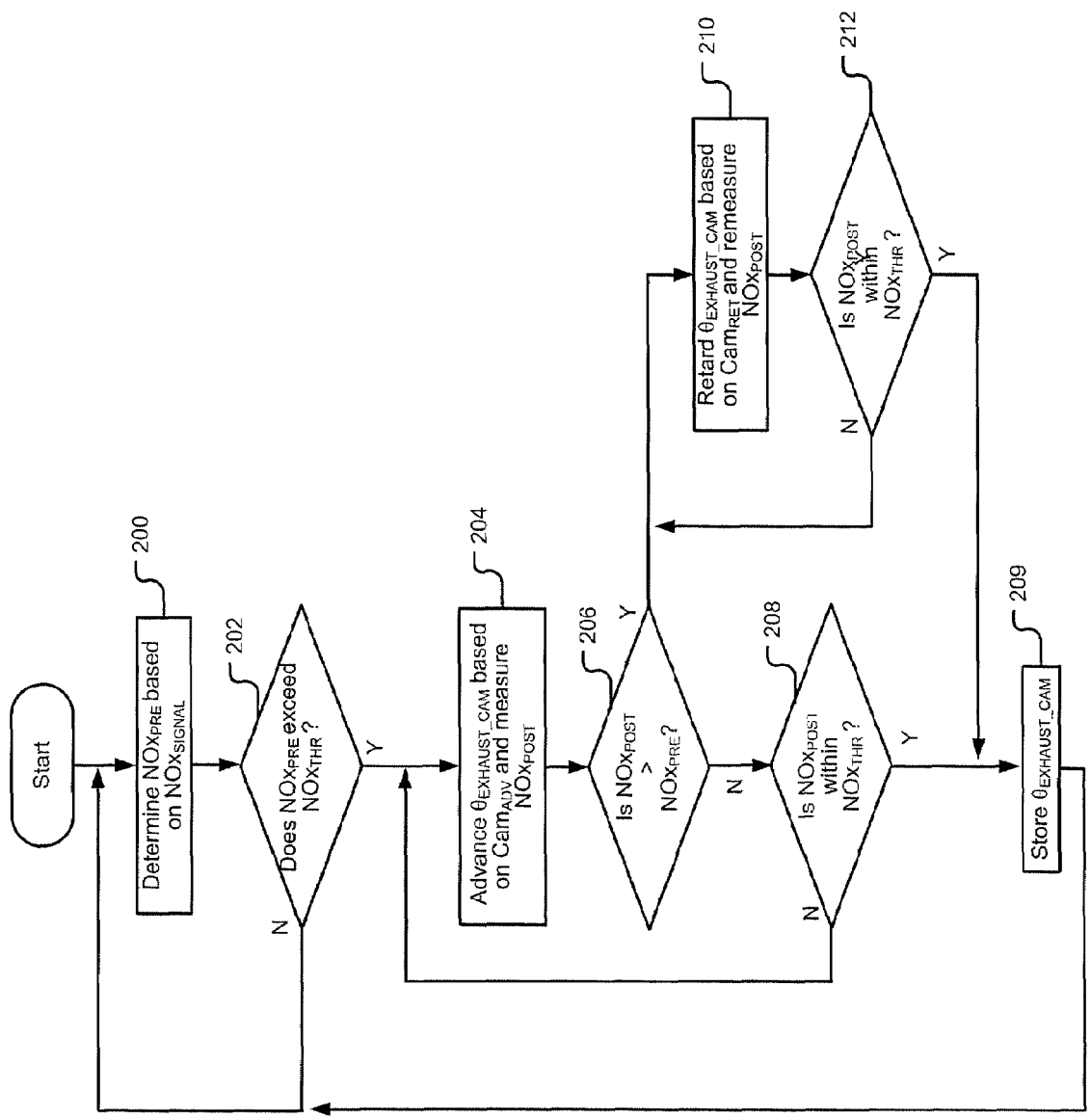
FIG. 2 is a flow chart illustrating steps executed by an emissions control system according to the present invention.

Referring now to FIG. 2, a flowchart illustrates the steps executed by the control system according to the present invention. In step 200, control determines the level of NOx exiting the engine 12 prior to adjusting the exhaust cam phaser 32 ($NOx_{PRE}$) based on $NOx_{SIGNAL}$. In step 203, control compares $NOx_{PRE}$ to $NOx_{THR}$. When $NOx_{PRE}$ exceeds $NOx_{THR}$, control advances $\theta_{EXHAUST\_CAM}$ based on $Cam_{ADV}$ and measures a second level of NOx ($NOx_{POST}$) subsequent to adjusting the exhaust cam phaser 32 in step 204. Otherwise, control returns to step 200. Although the flowchart describes initially advancing the exhaust cam phaser 32, it can be appreciated that the invention can initially retard the exhaust cam phaser 32.

In step 206, control compares $NOx_{POST}$ to $NOx_{PRE}$ and determines whether advancing the exhaust cam phaser 32 causes the level of NOx exiting the engine 12 to decrease. If $NOx_{POST}$ is less than $NOx_{PRE}$, then control compares $NOx_{POST}$ to $NOx_{THR}$ in step 208. Otherwise, control proceeds to step 210. In step 208, control determines whether $NOx_{POST}$ is within $NOx_{THR}$. When $NOx_{POST}$ is within $NOx_{THR}$, control stores $\theta_{EXHAUST\_CAM}$ and control returns to step 200. Otherwise, control returns to step 204 and continues advancing the exhaust cam phaser 32.

In step 210, control retards the exhaust cam phaser 32 and remeasures $NOx_{POST}$. In step 212, control compares $NOx_{POST}$ to $NOx_{THR}$. When $NOx_{POST}$ is within $NOx_{THR}$, control stores $\theta_{EXHAUST\_CAM}$, in step 209 and control returns to step 200. Otherwise, control returns to step 210, and continues adjusting the exhaust cam phaser 32.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system for adjusting levels of emissions exiting an engine with a camshaft that is associated with an exhaust valve and a cam phaser that interfaces with the camshaft, comprising:
   a NOx sensor that generates a NOx signal in response to oxides of nitrogen (NOx) in an exhaust gas; and
   a control module that communicates with the cam phaser, that receives said NOx signal, that calculates a NOx level of said exhaust gas based on said NOx signal, that compares said NOx level to a predetermined threshold range, that adjusts the cam phaser to achieve a rotational position that releases a desired level of NOx from the engine when said NOx level exceeds said predetermined threshold range, and that stores a rotational position value based on said rotational position in a storage device when said NOx level is within said predetermined threshold range,
   wherein said rotational position of the cam phaser controls an actuation time when the camshaft opens the exhaust valve during rotation of the camshaft.

2. The control system of claim 1 wherein said exhaust valve position determines an amount of said exhaust gas that exits the engine.

3. The control system of claim 1 wherein said predetermined threshold range is defined as having an upper NOx level value and a lower NOx level value.

4. The control system of claim 1 wherein said storage device includes a two-dimensional reference table that is indexed by a range of predetermined speed (RPM) values and a range of predetermined mass air flow (MAF) values.

5. The control system of claim 1 wherein said control module stores a rotational position value based on said rotational position according to a corresponding speed value and a corresponding load value included in said reference table.

6. The control system of claim 1 wherein said control module adjusts a rotational position of the cam phaser based on a rotational position value included in said reference table when the engine operates at a corresponding speed and a corresponding load included in said reference table.

7. A method for adjusting levels of emissions exiting an engine with a camshaft that is associated with an exhaust valve and a cam phaser that interfaces with the camshaft, comprising:
   measuring levels of oxides of nitrogen (NOx) associated with an exhaust gas;
   comparing said NOx levels to a predetermined threshold range;
   adjusting a rotational position of the cam phaser that adjusts an actuation time when the camshaft opens and closes the exhaust valve during a rotation of the camshaft to release a desired level of NOx from the engine,
   wherein said cam phaser adjustment is initiated when said levels of NOx exceed said predetermined threshold range; and
   storing a rotational position of the cam phaser the releases a desired level on NOx from the engine.

8. The method of claim 7 further comprising adjusting said opening and closing positions of the exhaust valve to adjust an amount of said exhaust gas that exits the engine.

9. The method of claim 7 further comprising storing a rotational position value based on said rotational position in a two-dimensional reference table that is indexed by a range of predetermined speed (RPM) values and a range of predetermined mass air flow (MAF) values.

10. The method of claim 9 further comprising storing said rotational position according to a corresponding speed value and a corresponding load value included in said reference table.

11. The method of claim 9 further comprising adjusting a rotational position of the cam phaser based on a rotational position value included in said reference table when the engine operates at a corresponding speed and corresponding load included in said reference table.

12. The method of claim 7 wherein said predetermined threshold range is defined as having an upper NOx level value and a lower NOx level value.

* * * * *